Sept. 6, 1960 C. F. BONHAM 2,951,563
BRAKE MECHANISM
Filed Jan. 15, 1957
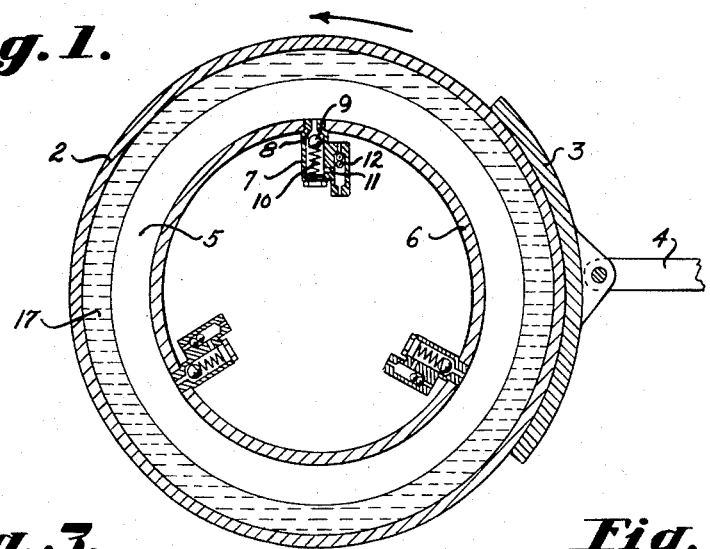
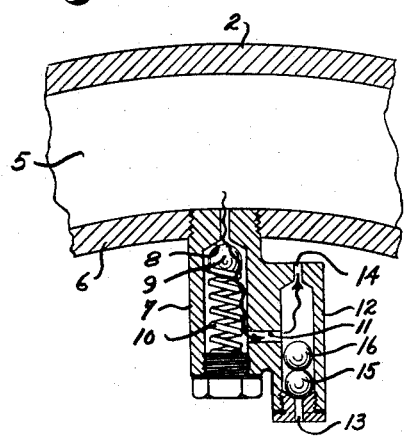
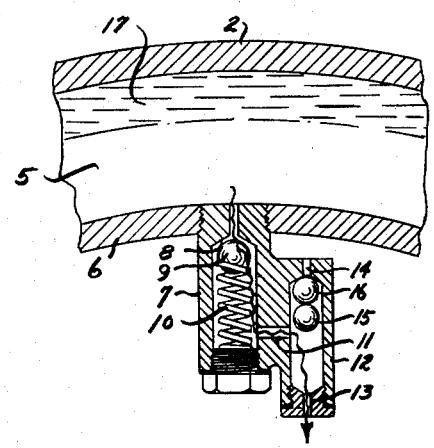
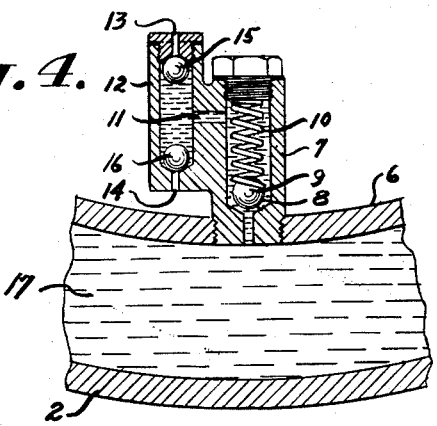
Claude F. Bonham United States Patent Office 2,951,563
Patented Sept. 6, 1960

2,951,563
BRAKE MECHANISM

Claude F. Bonham, Edinburg Township, Portage County, Ohio. (% Stardrill-Keystone Co., 920 17th St., Beaver Falls, Pa.)

Filed Jan. 15, 1957, Ser. No. 634,325

10 Claims. (Cl. 188—264)

This invention relates to brake mechanism and more particularly to fluid cooled brake mechanism. It relates still more particularly to fluid cooled brake mechanism having provision for venting volatilized coolant.

For purposes of explanation and illustration the invention will be described as embodied in vehicle wheel brake mechanism employing a friction type brake. A friction type brake is a device for converting mechanical energy into heat energy. The heat generated in the brake causes increase in temperature at the interface between the brake lining and the brake drum. The heat may be transferred by radiation, convection and/or conduction into the brake and adjacent parts of the vehicle. A single application of the brake may release only a small amount of heat with little increase in temperature. Repeated applications or prolonged application, especially at high braking effort, may produce a high temperature in the brake which may rapidly deteriorate the brake lining and bring about softening and consequent scoring of the brake drum.

Various expedients have been resorted to to reduce brake temperature. Forced air circulation has been tried but is not practicable because of the vast quantity of air required to hold the temperature to an acceptable level, particularly in heavy duty brakes. Cooling by water spray is effective but requires a great quantity of water a large part of which is wasted. In most vehicles the carrying of the required quantity of water is not practicable. Another method of cooling is to build a water chamber in or on the brake drum generally opposite the brake band and partially or wholly fill the water chamber with water, maintaining the chamber closed while the vehicle is in use. Such a "heat sink" brake may be suitable for relatively light duty operation but is not practicable for heavy duty work. The brake has a limited capacity and after that capacity has been exceeded dangerously high pressures and temperatures may exist in the cooling chamber. As a consequence such brakes are seldom used and are not commercially feasible.

I modify a brake of the type above referred to which is cooled by water or other coolant which is normally in liquid state but volatilizes under heat by installing a relief valve on the cooling chamber to release volatilized coolant when the pressure in the cooling chamber reaches a predetermined magnitude. For example, if the coolant is water, steam is generated after the temperature rises to a certain point and when the steam pressure reaches a predetermined value the pressure is released by the relief valve. Released steam efficiently carries away heat as not only the heat of the liquid but also the latent heat of vaporization exists in it. A commercially available spring-loaded check valve normally intended for hydraulic or other use may be employed. Such valves are available which will open at a predetermined pressure of, for example, 1, 2, 3, 4, or 5 pounds per square inch gauge, which is suitable for my purpose.

The relief valve should allow the release of vapor but not of liquid. The valve may be applied so that it is always above the liquid level in the cooling chamber or special provision may be made insuring against discharge of liquid in substantial quantity under any operating condition. The relief valve may as the wheel rotates assume alternately positions above and below the level of the unvolatilized coolant in the cooling chamber to allow passage of volatilized coolant when the pressure in the cooling chamber reaches a predetermined magnitude and closure means may be provided for the outlet from the relief valve, the closure means preferably being mounted to be maintained inoperative by centrifugal force during rotation of the wheel and by gravity when the relief valve is positioned above the level of the unvolatilized coolant in the cooling chamber when the wheel is not rotating and operative to close the outlet when the relief valve is open but positioned below the level of the unvolatilized coolant in the cooling chamber when the wheel is not rotating. The outlet may communicate with an outlet chamber which may have openings at both generally radial ends thereof with a closure member for each of the openings. The closure member for the upper opening when the relief valve is disposed toward the bottom of the wheel is preferably floatable on the unvolatilized coolant and the closure member for the lower opening when the relief valve is disposed toward the bottom of the wheel is preferably sinkable in the unvolatilized coolant. With such closure members both openings will be closed when the relief valve is open but positioned below the level of the unvolatilized coolant in the cooling chamber when the wheel is not rotating but one of the openings will be open during rotation of the wheel, when the closure members will both be thrown outwardly by centrifugal force and also when the wheel is not rotating and the relief valve is open and positioned above the level of the unvolatilized coolant in the cooling chamber, when gravity will draw down the closure members.

A plurality of relief valves may be provided in a single wheel so that in any position in which the wheel stops one of the openings in the outlet chamber of at least one of the valves will be open to vent volatilized coolant if the valves are open under pressure of volatilized coolant.

Other details, objects and advantages of the invention will become apparent as the following description of a present preferred embodiment thereof proceeds.

In the accompanying drawings I have shown a present preferred embodiment of the invention in which Figure 1 is a fragmentary diagrammatic cross-sectional view of a water cooled brake applied to a vehicle wheel, the wheel being shown while turning;

Figure 2 is a fragmentary diagrammatic cross-sectional view to enlarged scale showing the relief valve and associated mechanism while the wheel is turning with the relief valve open;

Figure 3 is a fragmentary diagrammatic cross-sectional view to enlarged scale showing the relief valve and associated mechanism with the wheel stopped and the relief valve open and disposed toward the top of the wheel and above the level of the unvolatilized coolant; and Figure 4 is a fragmentary diagrammatic cross-sectional view to enlarged scale showing the relief valve and associated mechanism with the wheel stopped and the relief valve open and disposed toward the bottom of the wheel and below the level of the unvolatilized coolant.

Referring now more particularly to the drawings, there is shown diagrammatically in Figure 1 a portion of a vehicle wheel including the brake drum 2, the wheel being shown while turning. A brake shoe shown diagrammatically at 3 is adapted to be pressed against the brake drum 2 when the brake is applied. While the brake shown in the drawings is of the external type the invention is equally applicable to internal brakes. A brake lining (not shown) may be applied to the brake shoe 3. More than one brake shoe may be utilized on the same wheel. The brake shoe or shoes may be operated by any suitable means such as indicated diagrammatically at 4 and not constituting the invention, such means being well known to those skilled in the art. When the brake shoe or shoes is or are applied to or pressed against the brake drum the friction tends to slow rotation of the wheel and is attended by evolution of heat. To convey away and dissipate the heat I provide within or in thermoconductive relation to the brake drum an annular cooling chamber 5. In the structure shown in the drawings the outer wall of the brake drum constitutes the outer wall of the cooling chamber and the inner wall of the cooling chamber is shown at 6. An opening (not shown) with a normally applied closure member is provided for introducing coolant into the cooling chamber 5. For purposes of this exemplary description the coolant will be considered to be water.

I provide at least one relief valve on the cooling chamber 5, the form of my invention shown in Figure 1 embodying three relief valves equally spaced apart about and communicating with the interior of the cooling chamber 5 and disposed generally in the space surrounded by the annular cooling chamber 5. For an internal brake the relief valves may be disposed radially outside or horizontally beside the brake structure. All of the three relief valves and the mechanism associated with each thereof are the same so description of one will suffice for all. Each relief valve comprises a casing 7 providing a valve seat 8 at its entrance and communicating with the interior of the cooling chamber 5. A valve element 9 which may be a sphere, for example of steel, is resiliently pressed against the seat 8 by a compression coil spring 10. Such structure of the valve may be conventional and is shown only diagrammatically in the drawings.

The outlet from each relief valve is shown at 11. Each outlet 11 communicates with an outlet chamber 12 shown as being elongated in the radial direction, each outlet chamber 12 having openings at both generally radial ends thereof, the radially inward opening in each outlet chamber being designated 13 and the radially outward opening 14. Two closure members are disposed in each outlet chamber 12. They are shown as being spherical in form although they may have other forms. The radially inward closure member is in each case designated 15 and is made of material, such as plastic, which will float on the unvolatilized coolant, while the radially outward closure member is in each case designated 16 and is made of material, such as steel, which will sink in the unvolatilized coolant.

Figure 2 shows one of the valves and its associated mechanism while the wheel is turning, i.e., while the closure members 15 and 16 are subjected to centrifugal force, the same as in Figure 1. They are both drawn outwardly by centrifugal force as shown in Figure 2 so that at all times while the wheel is turning the volatilized coolant is released through the opening 13 as indicated by the arrow in Figure 2. This, of course, presupposes that sufficient pressure has built up in the cooling chamber to open the relief valve against the action of the spring 10. When the wheel is turning only volatilized coolant will be vented since the unvolatilizer coolant (designated 17 in Figures 1, 2 and 4) is thrown out centrifugally against the outer wall 2 of the cooling chamber 5 and hence is not in position to pass through the relief valves. In the structure shown in the drawings the centrifugal action draws out the unvolatilized coolant into direct contact with the hottest part of the brake, thus increasing the efficiency of the cooling system.

Figure 3 shows one of the relief valves and its associated mechanism with the wheel stopped and the valve disposed toward the top of the wheel. The closure members 15 and 16 are drawn downwardly by gravity and the volatilized coolant is released through the opening 14 as indicated by the arrow in Figure 3.

Figure 4 shows one of the relief valves and its associated mechanism with the wheel stopped and the valve disposed toward the bottom of the wheel. It is assumed that there is sufficient unvolatilized coolant to fill the chamber of the relief valve and the outlet chamber 12. The floatable closure member 15 floats up on the unvolatilized coolant and closes the opening 13 and the sinkable closure member 16 sinks and closes the opening 14, thus preventing the outflow of unvolatilized coolant.

While I have shown and described a present preferred embodiment of the invention it is to be distinctly understood that the invention is not limited thereto but may be otherwise variously embodied within the scope of the following claims.

I claim:

1. Brake mechanism comprising a first element rotatable in a generally vertical plane, a second element adapted to frictionally engage the first element to brake the same with accompanying evolution of heat, a cooling chamber containing normally liquid heat-volatilizable coolant carried by the first element adapted to absorb heat of friction, a relief valve on the cooling chamber which as the first element rotates assumes alternately positions above and below the level of the unvolatilized coolant in the cooling chamber to allow passage of volatilized coolant when the pressure in the cooling chamber reaches a predetermined magnitude, an outlet from the relief valve and means closing the outlet when the relief valve is open but positioned below the level of the unvolatilized coolant in the cooling chamber when the first element is not rotating.

2. Brake mechanism comprising a first element rotatable in a generally vertical plane, a second element adapted to frictionally engage the first element to brake the same with accompanying evolution of heat, a cooling chamber containing normally liquid heat-volatilizable coolant carried by the first element adapted to absorb heat of friction, a relief valve on the cooling chamber which as the first element rotates assumes alternately positions above and below the level of the unvolatilized coolant in the cooling chamber to allow passage of volatilized coolant when the pressure in the cooling chamber reaches a predetermined magnitude, an outlet from the relief valve and closure means for the outlet, the closure means being mounted to be maintained inoperative by centrifugal force during rotation of the first element.

3. Brake mechanism comprising a first element rotatable in a generally vertical plane, a second element adapted to frictionally engage the first element to brake the same with accompanying evolution of heat, a cooling chamber containing normally liquid heat-volatilizable coolant carried by the first element adapted to absorb heat of friction, a relief valve on the cooling chamber which as the first element rotates assumes alternately positions above and below the level of the unvolatilized coolant in the cooling chamber to allow passage of volatilized coolant when the pressure in the cooling chamber reaches a predetermined magnitude, an outlet from the relief valve and closure means for the outlet, the closure means being mounted to be maintained inoperative by gravity when the relief valve is positioned above the level of the unvolatilized coolant in the cooling chamber when the first element is not rotating.

4. Brake mechanism comprising a first element rotatable in a generally vertical plane, a second element adapted to frictionally engage the first element to brake the same with accompanying evolution of heat, a cooling chamber containing normally liquid heat-volatilizable coolant carried by the first element adapted to absorb heat of friction, a relief valve on the cooling chamber which as the first element rotates assumes alternately positions above and below the level of the unvolatilized coolant in the cooling chamber to allow passage of volatilized coolant when the pressure in the cooling chamber reaches a predetermined magnitude, an outlet from the relief valve and closure means for the outlet, the closure means being mounted to be maintained inoperative to close the outlet by centrifugal force during rotation of the first element and by gravity when the relief valve is positioned above the level of the unvolatilized coolant in the cooling chamber when the first element is not rotating and operative to close the outlet when the relief valve is open but positioned below the level of the unvolatilized coolant in the cooling chamber when the first element is not rotating.

5. Brake mechanism comprising a first element rotatable in a generally vertical plane, a second element adapted to frictionally engage the first element to brake the same with accompanying evolution of heat, a cooling chamber containing normally liquid heat-volatilizable coolant carried by the first element adapted to absorb heat of friction, a relief valve on the cooling chamber which as the first element rotates assumes alternately positions above and below the level of the unvolatilized coolant in the cooling chamber to allow passage of volatilized coolant when the pressure in the cooling chamber reaches a predetermined magnitude, an outlet from the relief valve, an outlet chamber with which the outlet from the relief valve communicates, the outlet chamber having openings at both generally radial ends thereof, and a closure member for each of the openings, the closure member for the upper opening when the relief valve is below the axis of the first element being floatable on the unvolatilized coolant and the closure member for the lower opening when the relief valve is below the axis of the first element being sinkable in the unvolatilized coolant.

6. Brake mechanism comprising a vehicle wheel having a brake drum, braking means adapted to act against the brake drum for braking the wheel, a cooling chamber containing normally liquid heat-volatilizable coolant connected with the brake drum generally opposite the braking means, a relief valve on the cooling chamber which as the wheel rotates assumes alternately positions above and below the level of the unvolatilized coolant in the cooling chamber to allow passage of volatilized coolant when the pressure in the cooling chamber reacher a predetermined magnitude, an outlet from the relief valve and closure means for the outlet, the closure means being mounted to be maintained inoperative to close the outlet by centrifugal force during rotation of the wheel and by gravity when the relief valve is positioned above the level of the unvolatilized coolant in the cooling chamber when the wheel is not rotating and operative to close the outlet when the relief valve is open but positioned below the level of the unvolatilized coolant in the cooling chamber when the wheel is not rotating.

7. Brake mechanism comprising a vehicle wheel having a brake drum, braking means adapted to act against the brake drum for braking the wheel, a cooling chamber containing normally liquid heat-volatilizable coolant connected with the brake drum generally opposite the braking means, a plurality of relief valves on the cooling chamber spaced thereabout which as the wheel rotates successively assume alternately positions above and below the level of the unvolatilized coolant in the cooling chamber to allow passage of volatilized coolants when the pressure in the cooling chamber reaches a predetermined magnitude, an outlet from each relief valve and closure means for each outlet, the closure means for each outlet being mounted to be maintained inoperative to close the outlet by centrifugal force during rotation of the wheel and by gravity when the relief valve is positioned above the level of the unvolatilized coolant in the cooling chamber when the wheel is not rotating and operative to close the outlet when the relief valve is open but positioned below the level of the unvolatilized coolant in the cooling chamber when the wheel is not rotating.

8. Brake mechanism comprising a vehicle wheel having a brake drum, braking means adapted to act against the brake drum for braking the wheel, a cooling chamber containing normally liquid heat-volatilizable coolant connected with the brake drum generally opposite the braking means, a relief valve on the cooling chamber which as the wheel rotates assumes alternately positions above and below the level of the unvolatilized coolant in the cooling chamber to allow passage of volatilized coolant when the pressure in the cooling chamber reaches a predetermined magnitude, an outlet from the relief valve, an outlet chamber with which the outlet communicates, the outlet chamber having openings at both generally radial ends thereof, and a closure member for each of the openings, the closure member for the upper opening when the relief valve is in its lowermost position being floatable on the unvolatilized coolant and the closure member for the lower opening when the relief valve is in its lowermost position being sinkable in the unvolatilized coolant.

9. Brake mechanism comprising a vehicle wheel having a brake drum, braking means adapted to act against the brake drum for braking the wheel, a cooling chamber containing normally liquid heat-volatilizable coolant connected with the brake drum generally opposite the braking means, a plurality of relief valves on the cooling chamber spaced thereabout which as the wheel rotates successively assume alternately positions above and below the level of the unvolatilized coolant in the cooling chamber to allow passage of volatilized coolant when the pressure in the cooling chamber reaches a predetermined magnitude, an outlet from each relief valve, an outlet chamber with which each outlet communicates, each outlet chamber having openings at both generally radial ends thereof, and a closure member for each of the openings, the closure member for the upper opening of each outlet chamber when its relief valve is in its lowermost position being floatable on the unvolatilized coolant and the closure member for the lower opening of each outlet chamber when its relief valve is in its lowermost position being sinkable in th unvolatilized coolant.

10. Brake mechanism comprising a vehicle wheel having a brake drum, braking means adapted to act against the outside of the brake drum for braking the wheel, a generally annular cooling chamber containing normally liquid heat-volatilizable coolant at least partially within the brake drum generally opposite the braking means, a relief valve on the generally annular cooling chamber and disposed generally in the space surrounded by the generally annular cooling chamber which as the wheel rotates assumes alternately positions above and below the level of the unvolatilized coolant in the cooling chamber to allow passage of volatilized coolant when the pressure in the cooling chamber reaches a predetermined magnitude, an outlet from the relief valve and closure means for the outlet, the closure means being mounted to be maintained inoperative to close the outlet by centrifugal force during rotation of the wheel and by gravity when the relief valve is positioned above the level of the unvolatilized coolant in the cooling chamber when the wheel is not rotating and operative to close the outlet when the relief valve is open but positioned below the level of the unvolatilized coolant in the cooling chamber when the wheel is not rotating.

References Cited in the file of this patent

UNITED STATES PATENTS

| | | |
|---|---|---|
| 1,598,019 | Shirley | Aug. 31, 1926 |
| 1,893,942 | Jensen | Jan. 10, 1933 |
| 2,111,335 | Sanford | Mar. 15, 1938 |
| 2,113,454 | Mitchell | Apr. 5, 1938 |
| 2,372,984 | Pierce | Apr. 3, 1945 |
| 2,406,120 | Wirth | Aug. 20, 1946 |

FOREIGN PATENTS

| | | |
|---|---|---|
| 853,806 | France | Dec. 16, 1939 |
| 667,280 | Great Britain | Feb. 27, 1952 |
| 538,028 | Italy | Jan. 16, 1956 |